No. 730,106. PATENTED JUNE 2, 1903.
W. FROST.
BALING PRESS.
APPLICATION FILED AUG. 26, 1902.
NO MODEL.
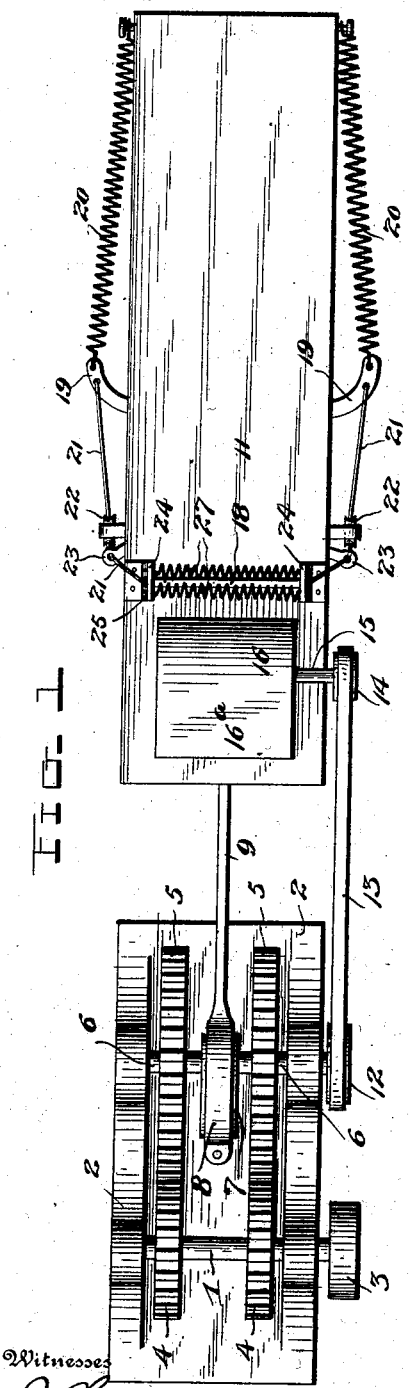
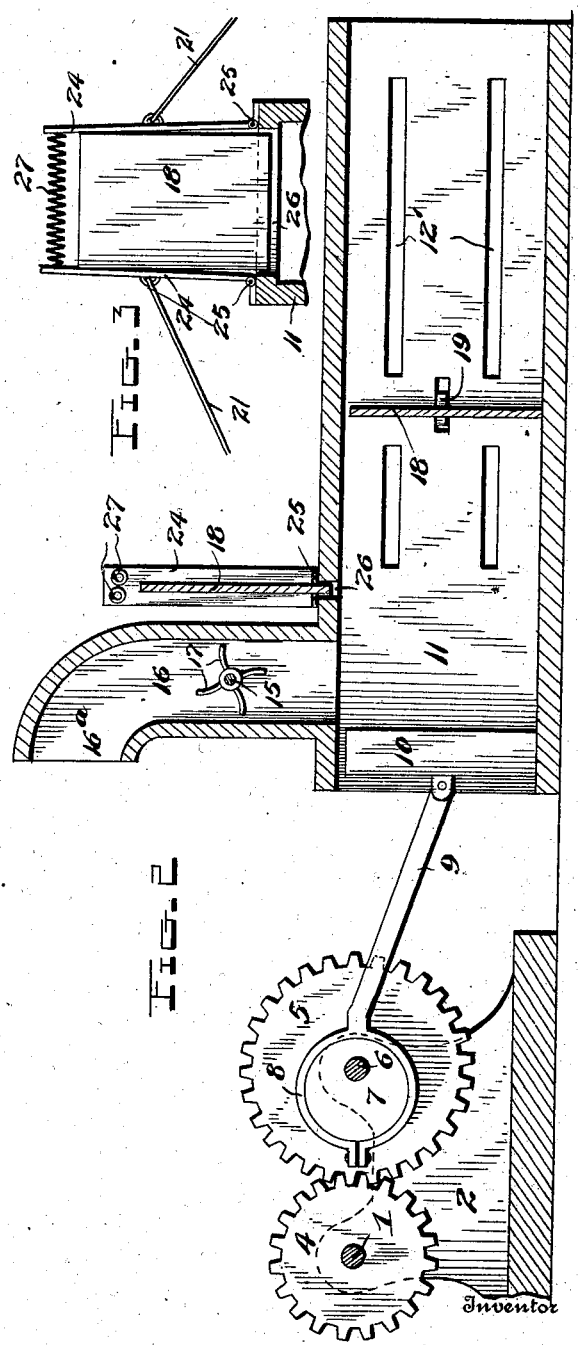
Inventor
William Frost
By H. B. Willson & Co.
Attorneys
Witnesses No. 730,106. Patented June 2, 1903.

UNITED STATES PATENT OFFICE.

WILLIAM FROST, OF TALLULO, ILLINOIS.

BALING-PRESS.

SPECIFICATION forming part of Letters Patent No. 730,106, dated June 2, 1903.

Application filed August 26, 1902. Serial No. 121,062. (No model.)

*To all whom it may concern:*

Be it known that I, WILLIAM FROST, a citizen of the United States, residing at Tallulo, in the county of Menard and State of Illinois, have invented certain new and useful Improvements in Baling-Presses; and I do declare the following to be a full, clear, and exact description of the invention, such as will enable others skilled in the art to which it appertains to make and use the same.

My invention relates to baling-presses, and especially to a device of this character which may be attached to a threshing-machine to bale the straw as it comes from the same.

The object of the invention is to produce a press of this character which is simple in construction, durable in use, and efficient in operation.

With the above and other objects in view, which will readily appear as the nature of the invention is better understood, said invention consists in certain novel features of construction and combination and arrangement of parts, which will be hereinafter fully described and claimed, and illustrated in the accompanying drawings, in which—

Figure 1 is a top plan view of my improved baling-press. Fig. 2 is a vertical longitudinal section through the same. Fig. 3 is a detail view of the hinged arms or uprights.

Referring more particularly to the drawings, the numeral 1 denotes the driving-shaft, mounted in suitable bearings on the frame 2 and provided upon one end with a belt wheel or pulley 3, which is adapted to receive motion from the threshing-machine (not shown) by means of a suitable band or belt. This shaft 1 is also provided with two cog-wheels or pinions 4 4, which mesh with two large gear-wheels 5 5, secured to the shaft 6, which is also journaled in bearings in the frame 2.

Fixed to the shaft 6 between the gears 5 5 is an eccentric 7, which carries the eccentric-strap 8, to which one end of the pitman 9 is rigidly secured, the other end of which is pivoted to the compressing-plunger 10, which reciprocates in the bale-chamber 11. Upon one end of the shaft 6 is also secured the pulley or belt-wheel 12, which is connected by the belt or band 13 to a similar pulley or belt-wheel 14 on a shaft 15, journaled in the mouth of a hopper 16, which is mounted upon the rear end of the bale-chamber 11. This shaft 15 is provided with a series of flat spring feeder-arms 17, which force the hay or straw down through the hopper into the bale-chamber in advance of the plunger 10. The hopper 16 is preferably rectangular and provided with a hood 16ª and is adapted to receive the straw directly from the straw-carrier of the threshing-machine.

In order to compress the bale to the proper density between the follower-boards 18, I pivot in each side of the chamber 11 a stop or dog 19, one end of which projects into the chamber and limits the movement of the follower-boards, and the other end projects upon the outside of the chamber and is held in the proper position by the coil-spring 20, the tension of which may be changed to regulate the desired density of the bale. To the outer ends of the dogs are also secured one end of the cables or cords 21, which extend rearwardly over the guide-pulleys 22, then upwardly through the guide-eyes 23, and have their ends secured to the vertical arms or standards 24, which are hinged at 25 to the top of the bale-chamber in advance of the hopper 13 and at each end of the transverse opening or aperture 26, through which the follower-boards 18 are adapted to be dropped or fed. In order to automatically drop the follower-boards at the proper time to start a new bale, one is suspended over the opening 26 and held between the gripping-arms 24 by the tension of the coil-springs 27, which connect the upper ends of said arms.

In the operation of my device it will be seen that as the straw is fed through the hopper 16 into the rear end of the bale-chamber 11, between the plunger 10 and the follower 18, which will abut against the inner ends of the dogs 19, the pressure will increase as the plunger is reciprocated until the required degree of density is reached and until it overcomes the resistance of the dogs and the coil-springs 20 and the follower passes beyond the dogs 19. As soon as this happens the springs 20 will draw the outer ends of the dogs forwardly and pull upon the cables 21, which will separate the arms 24 and allow the follower-board 18, which is held between them, to drop through the guide-opening 26 into the bale-chamber, when a new bale will be formed by the continuous feeding of the straw and the reciprocating of the plunger. The bale just formed or pressed will be forced forwardly as the new one is being compressed until it entirely clears the dogs, when the proper bales or ties may be passed through the slots 12' in the sides of the chamber about the bale and secured before it leaves the bale-chamber.

From the foregoing description, taken in connection with the accompanying drawings, it is thought that the construction, operation, and advantages of my improved baling-press will be readily apparent without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A baling-press having a bale-chamber, a movable follower-board-engaging dog, a device to support a follower-board above the bale-chamber, a connection between the dog and the follower-board-supporting device to cause the latter to release the follower-board when the dog is moved, means to move the dog, substantially as described.

2. A baling-press having a bale-chamber, a movable follower-board-engaging dog, a spring-pressed gripping device to support a follower-board above the bale-chamber, a spring to move the dog in one direction, and a connection between the dog and the gripping device, to cause the latter to release the follower-board when the dog is thus moved, substantially as described.

3. A baling-press having a bale-chamber provided with a guide for feeding a follower-board thereto, a device to detain a follower-board in said guide, and a movable dog connected to and controlling the detaining device, substantially as described.

4. A baling-press having a bale-chamber, means to feed a follower-board thereto, and a movable dog having a connection with and controlling said follower-board feeder, substantially as described.

5. In a baling-press, the combination of a bale-chamber, a feed-hopper therefor, a shaft revoluble in the throat of the hopper and provided with feeder-arms, a reciprocating follower, a power-shaft, connections between the latter and the follower to actuate the follower, and connections between the power-shaft and the feed-shaft to rotate the latter, substantially as described.

6. A baling-press having a baling-chamber, spring-pressed grippers to support a follower-board above the bale-chamber, pivoted follower-board-engaging dogs projecting into the baling-chamber, springs to move said dogs in one direction, and flexible elements connecting said dogs to said grippers, for the purpose set forth, substantially as described.

In testimony whereof I have hereunto set my hand in presence of two subscribing witnesses.

WILLIAM FROST.

Witnesses:
J. HAURSTBURK,
THOS. HUTTON.